April 7, 1931.  H. R. PORTER  1,799,390

METHOD OF MAKING A VALVE ASSEMBLY

Filed April 7, 1928

INVENTOR:
BY Harper R. Porter,
HSwenarton
His ATTORNEY.

Patented Apr. 7, 1931

1,799,390

UNITED STATES PATENT OFFICE

HARPER R. PORTER, OF NILES, OHIO, ASSIGNOR TO THE COLUMBUS MACHINE COMPANY, OF COLUMBUS, OHIO, A CORPORATION OF OHIO

METHOD OF MAKING A VALVE ASSEMBLY

Application filed April 7, 1928. Serial No. 268,135.

This invention relates to heavy duty valves, such as are required in oil refineries, power plants, mines, high pressure steam lines and for other purposes wherein a valve is subjected to high temperatures and pressures.

The principal objects of the invention are the expeditious and economical production of a heavy duty valve, such as aforesaid, which is light, durable, highly resistant to distortion and leakage under the varying conditions of operation and which is withal highly efficient, besides having other advantages.

In the accompanying drawings the various stages in the manufacture by extrusion of a valve embodying my invention are illustrated:

Figure 1:
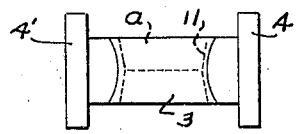
Figure 1 is a longitudinal side elevation of an extruded forged or cast hub-insert for the die which is employed in the extrusion operation.
Figure 2:
Fig. 2 is an end elevation and Fig. 3 is a plan view of the same forging.
Figure 6:
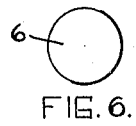
Fig. 5 is an elevation and Fig. 6 is an end view of a billet from which the valve body is extruded.
Figure 3:
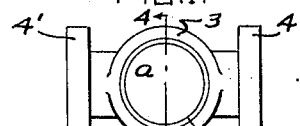
Figure 4:
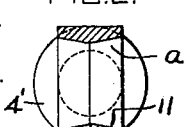
Fig. 4 is a vertical section on the line 4—4 of Fig. 3.
Figure 5:
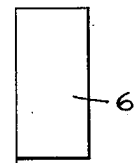

Referring to the drawings, the reference numeral 1 designates a split die in which is inserted an extruded solid hub member 2 which has an enlarged central annulus 3 that is adapted to serve as a mold for the lower portion of the valve body adjacent the respective hubs 4, 4'.

Figure 7:
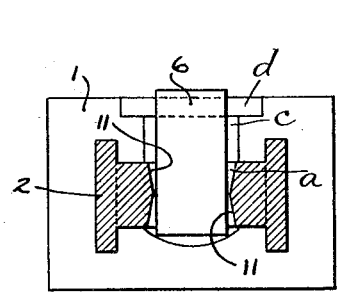
Fig. 7 is a side elevation of one-half of the die with hub and billet positioned therein, the former being shown in section and the latter in elevation.
Figure 8:
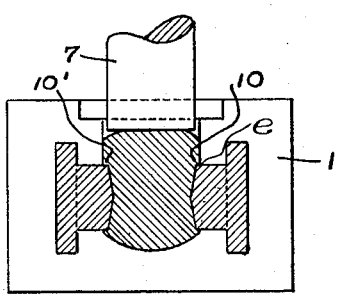
Fig. 8 illustrates initial operation on billet.
Figure 9:
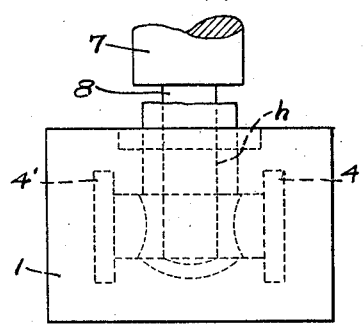
Fig. 9 illustrates the extruding operation and shows the position of the supplemental plunger following the formation of the valve chamber.
Figure 10:
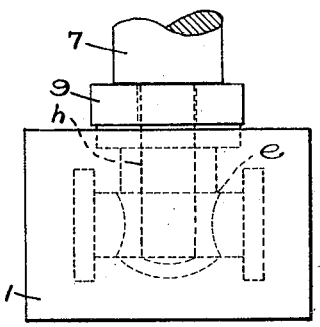
Fig. 10 is a similar view after the top flange has been extruded showing the latter plunger equipped with the flange-forming ring.
Figure 11:
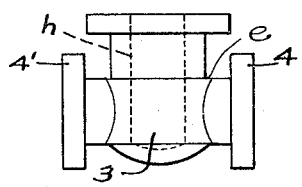
Figs. 11 and 12 show a side elevation and an end elevation respectively of the extruded valve body.
Figure 12:
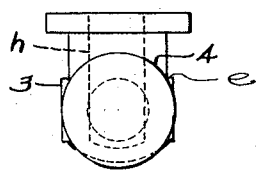

A billet 6, preferably of cylindrical configuration, after being first heated to a suitable temperature to admit of the extrusion thereof, is inserted into the die and into the chamber $a$ of the hub insert as shown in Fig. 7 and, while the insert and billet are maintained at an extrusion temperature, the plunger 7 is forced downwardly against the billet so as to cause the same to flow into the cavities of the die and of the hub member as a result of which said billet assumes the position shown in Fig. 8. Said plunger is then withdrawn and a second plunger 8 is then forced into the partially extruded billet shown in Fig. 8 whereby the same is further extruded into the shape shown in Fig. 9 and the valve chamber $b$ and the side and bottom walls of the body 10 are simultaneously formed while at the same time the hub section 2 becomes virtually an integral part of the valve body proper. While still maintaining the die and the metal shapes therein at an extrusion temperature, said plunger 8 is withdrawn and the flange-forming ring 9 is applied thereto and the plunger is again forced downwardly into the metal shape as shown in Fig. 10, whereby the metal at the upper end of the shape shown in Fig. 9 is upset to form the top flange.

As shown, the central chamber or recess $a$ in the boss 3 is of a configuration of two truncated cones supra-imposed and inverted with respect to each other, being of smallest cross-section at its middle point and of greatest cross-section at its respective ends.

The rough body obtained in the foregoing manner is then subjected to a piercing operation to form fluid ways 13 and 14 respectively, which extend longitudinally completely through the hub section 2 and also completely through the opposite side walls of the valve body 10 whereby communication between the valve chamber $b$ and the line connections to which the valve is secured is afforded.

The entire cavity $c$ of the die, with the exception of the ring receiving recess $d$ at its upper end is, as shown, of slightly greater cross-section throughout than the maximum cross-section of the chamber a in the hub section and consequently during the extrusion operation the shoulder e will be formed on the valve body and said shoulder will serve to effectively position and anchor the hub section to the body.

The foregoing method produces a valve assembly which is peculiarly adapted for use under high temperature and pressure conditions as the valve body proper is not only of homogeneous texture throughout the side walls wherein the greatest pressures and stresses are attained, but the area adjacent the hub is reinforced by a continuous belt of metal which becomes by virtue of the extrusion operation, substantially an integral part of the valve body, though the latter has been formed subsequent to the formation of the hub section, the same being molecularly united thereto.

Though the joints between the hub section and the valve body are essentially eliminated by this construction, nevertheless, hub sections adapted to different sizes of line connections can be applied to a standard size of body, thus reducing the expense of making valves of different sizes where there is not too great a variance between sizes. For example, a 2″, 4″ or 6″ valve can be made by employing the appropriate size of hub section and extruding the same size of body in a central chamber of standard size which is provided in each hub section irrespective of whether it is a 2″, 4″ or 6″ hub section.

As previously stated, the hub section which is preformed prior to its introduction into the mold may be also the product of an extrusion operation, and this is preferable where the die is to be employed for high temperature and pressure operations or it may be hammer forged or cast if desired.

The valve body herein described may be utilized for a gate valve, a check valve, globe valve or in any type of valve or fitting wherein such a body would be serviceable.

Various modifications of the within described method and the resultant valve body within the scope of the claims may be made without departing from the spirit of my invention.

Having thus described my invention, what I claim and desire to obtain by United States Letters Patent is:

1. The method of making a valve assembly which comprises forming a unitary hub section having oppositely disposed cylindrical hub members and a central transversely apertured boss, inserting said section in a die having a recess of the shape of the desired valve assembly, introducing a heated billet in the portion of the recess in the die which is in communication with the said aperture in said boss and effecting the extrusion of said billet into a hollow valve body while maintaining the same at an extrusion temperature and while the lower portion of the valve body so formed is confined by said hub section, then piercing fluid ways through the hub members and the adjacent walls of the extruded valve body so obtained.

2. The method of making a valve assembly which comprises forming a unitary hub section having oppositely disposed terminal hub members and a central enlarged boss having a transverse passage extending completely therethrough, forcing a heated billet into the aperture in said boss while confining said billet in a die having a cavity conforming to the shape of the finished valve body desired and maintaining the same at an extrusion temperature, effecting the extrusion of said billet into a hollow valve body having solid side walls, a portion of which side walls are encased within said passage in said boss and are extruded in intimate and fluid-tight contact therewith and then removing the rough finished valve body from the die and piercing a longitudinal fluid way completely through the hub section and the valve body encased thereby.

3. The method of making a valve assembly which comprises forming a unitary hub member having oppositely disposed terminal hubs and a central transverse passage extending completely therethrough and of substantially greater cross-section than the minimum cross-section of the hub member, introducing said hub section into a die having a cavity conforming substantially to the configuration of the desired valve, introducing a billet of sufficient size to form, when extruded, the valve body desired and effecting the extrusion of said billet while heated at an extrusion temperature into a hollow valve body, which has a portion thereof adjacent the lower end completely enveloped by the hub section, removing the rough finished valve from the die and piercing a fluid-way completely through the hub section and the portion of the valve body embraced thereby.

4. The method of making a valve assembly which comprises forming a unitary hub section having oppositely disposed cylindrical apertured members and a central enlarged boss having a transverse passage extending completely therethrough, introducing the same into a die and introducing sufficient additional metal into said die to complete the formation of the desired valve body and then forming the completed valve body at an elevated temperature while molecularly uniting said additional metal to said preformed hub section.

Signed at Niles, in the county of Trumbull, and State of Ohio, this 8th day of March, 1928.

HARPER R. PORTER.